July 22, 1924.
S. G. NEAL
1,502,521
AIR BRAKE APPARATUS
Filed Oct. 27, 1923    10 Sheets-Sheet 3
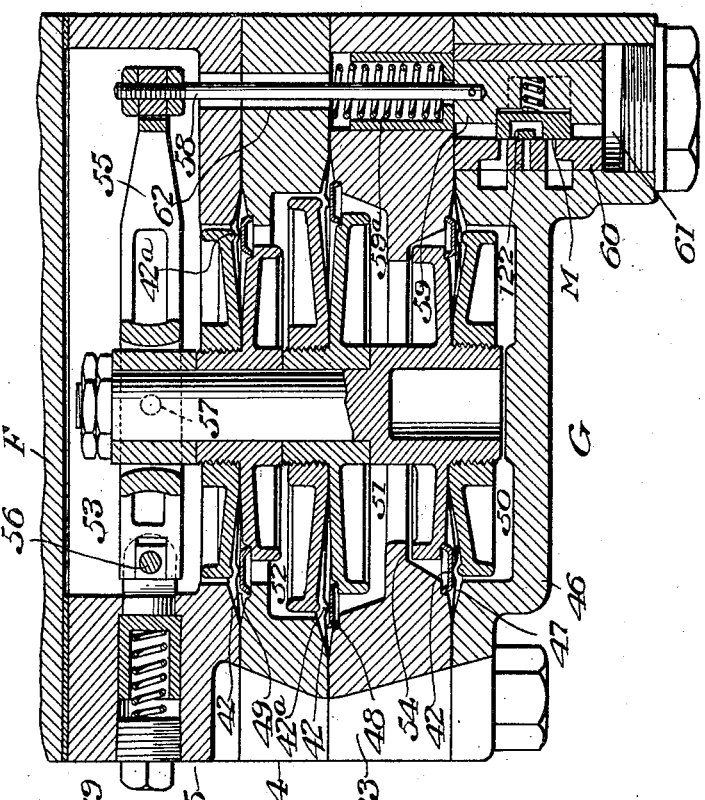
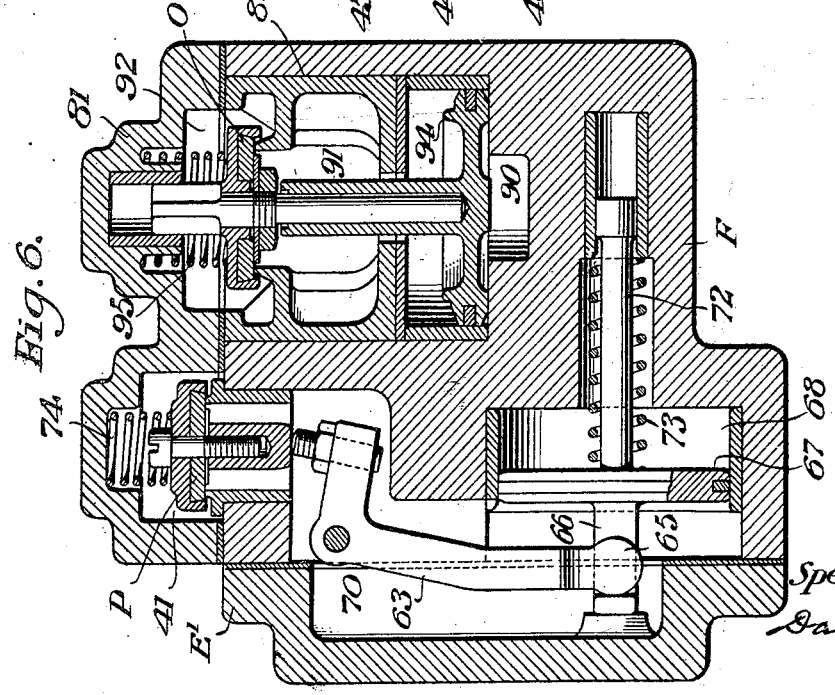
INVENTOR
Spencer G. Neal
ATTORNEYS

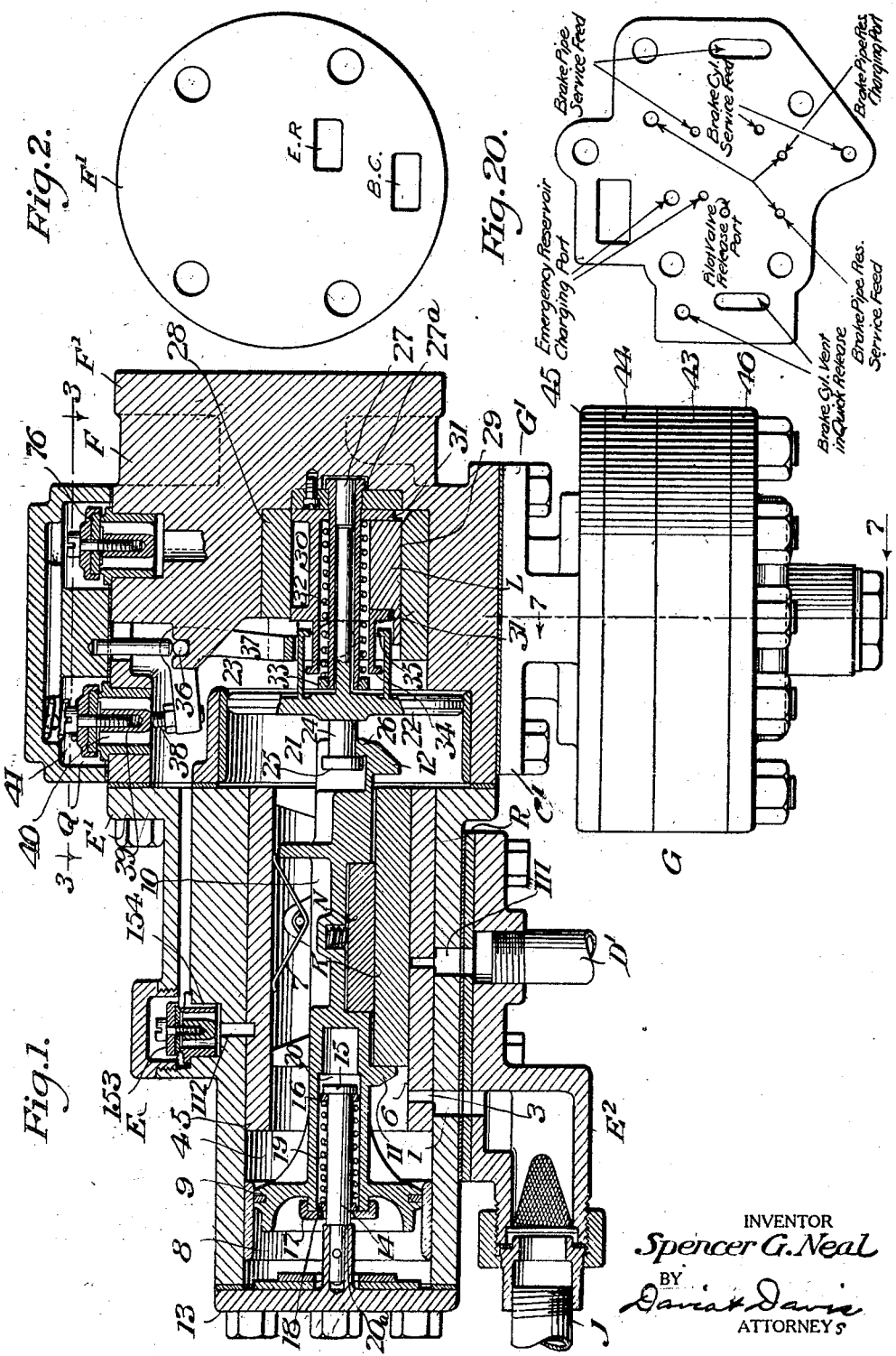

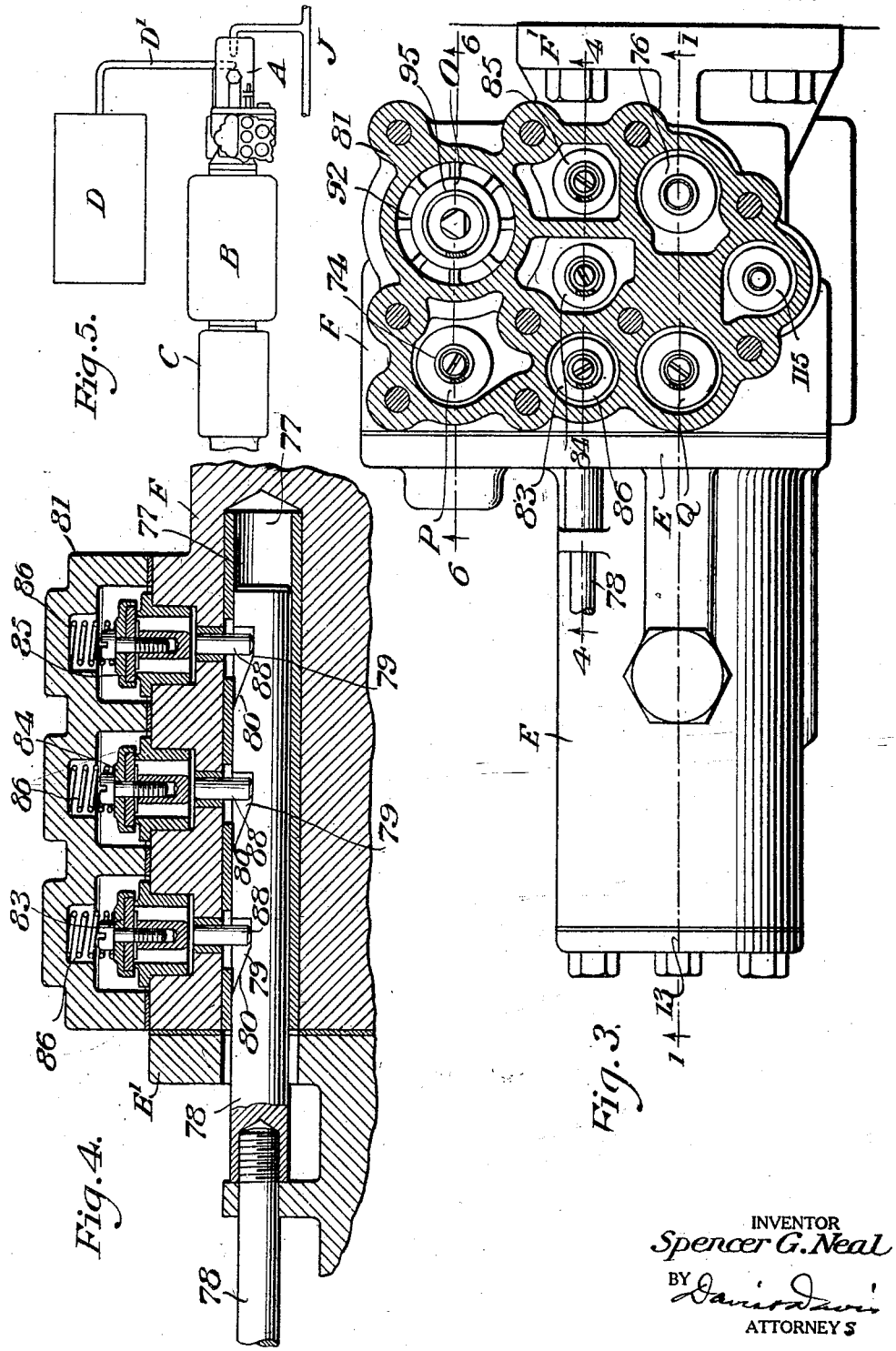

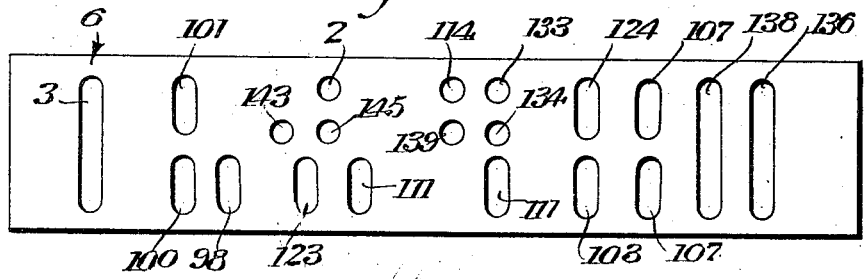
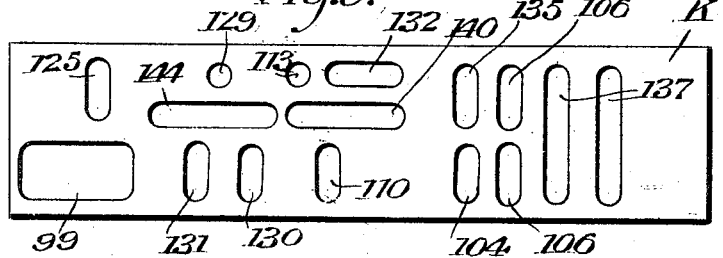
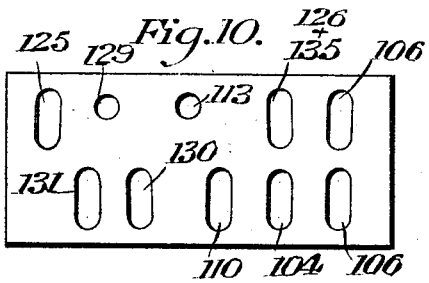
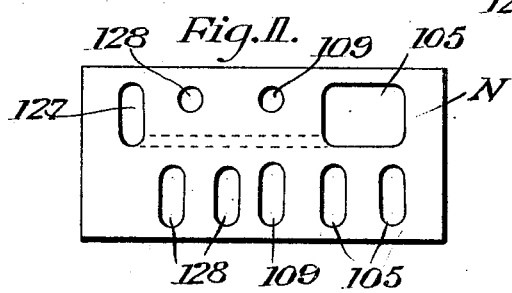
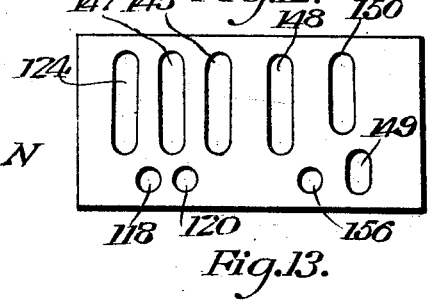
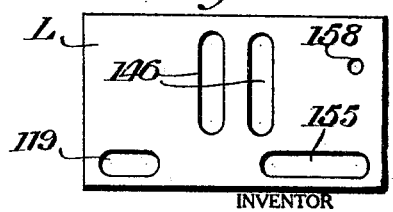

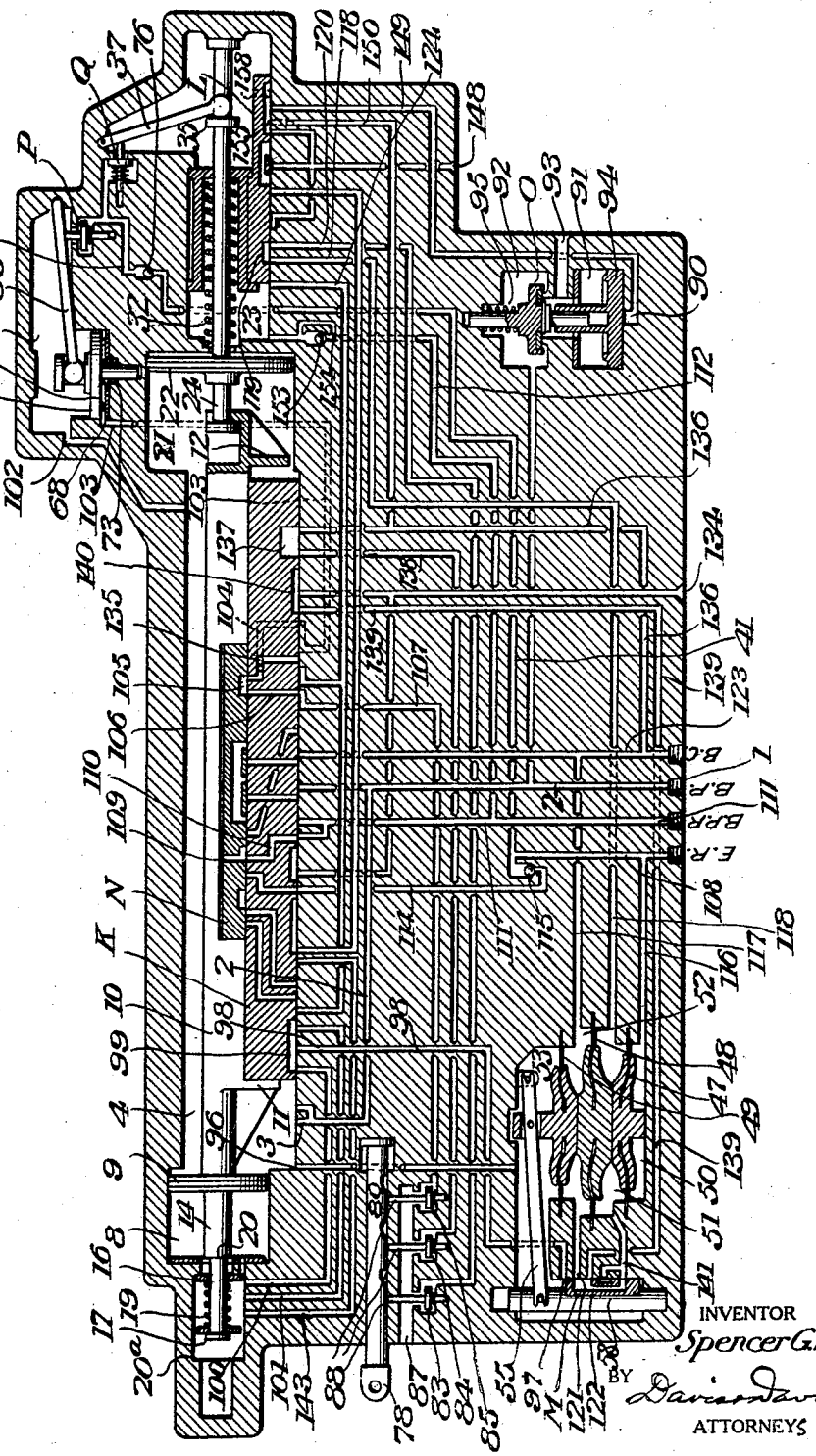

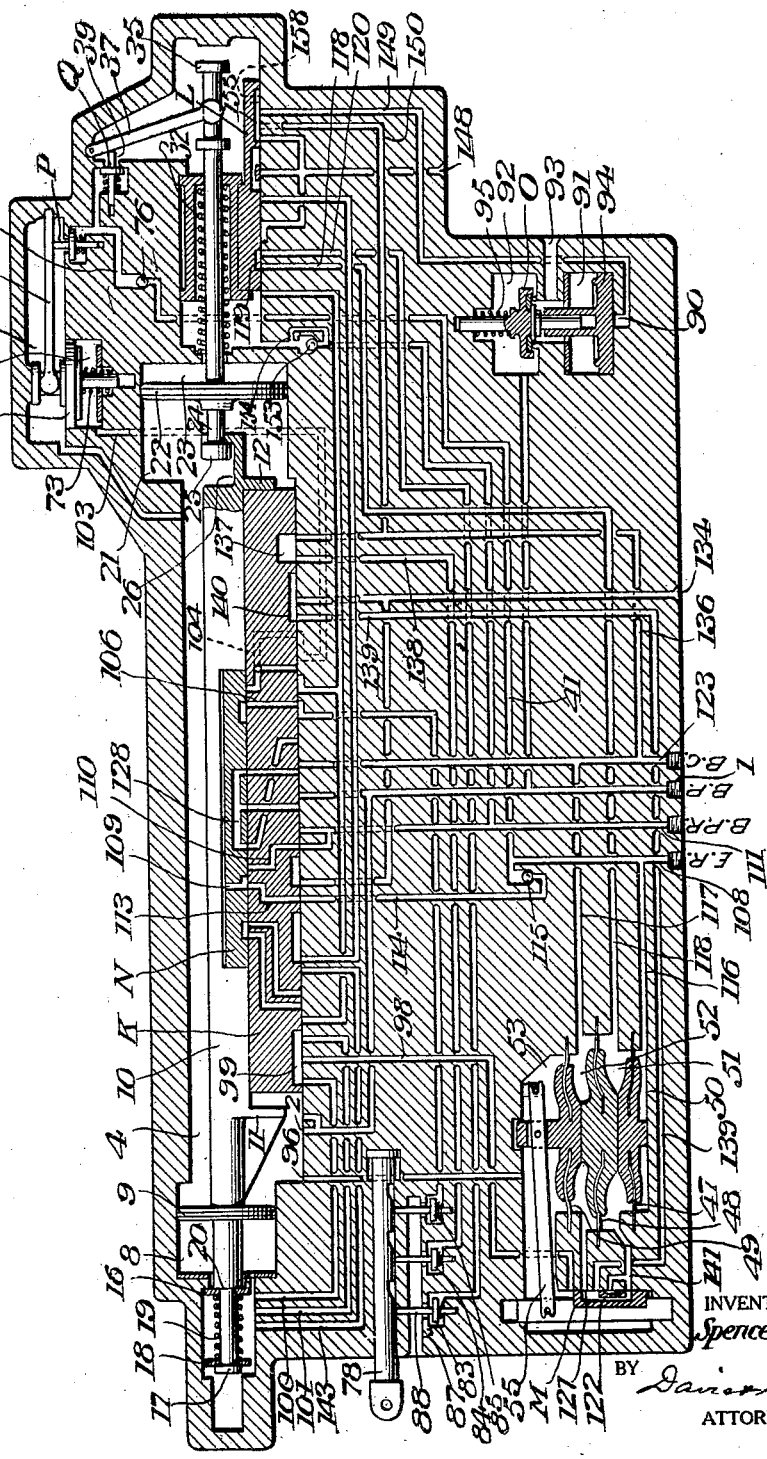

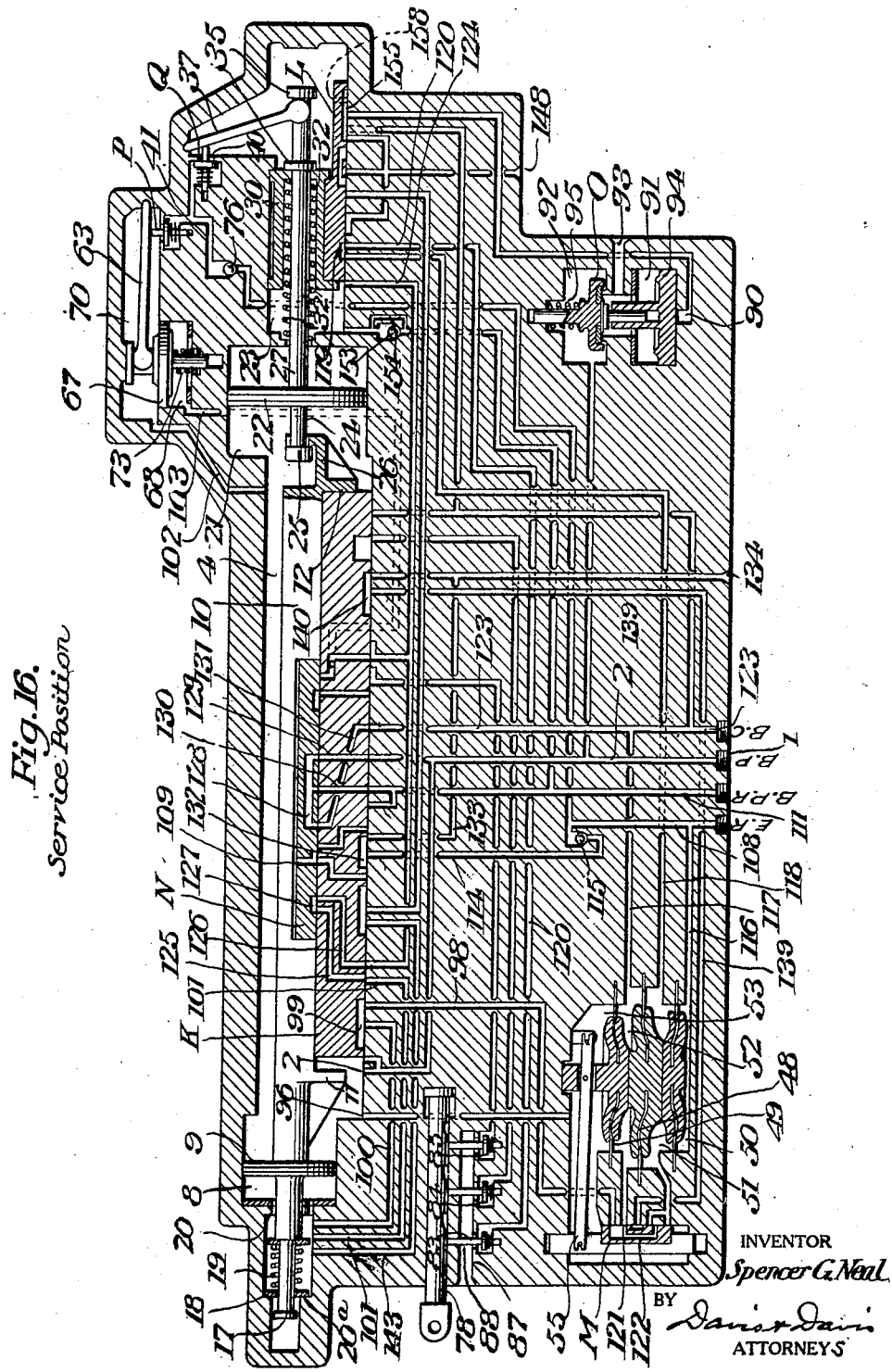

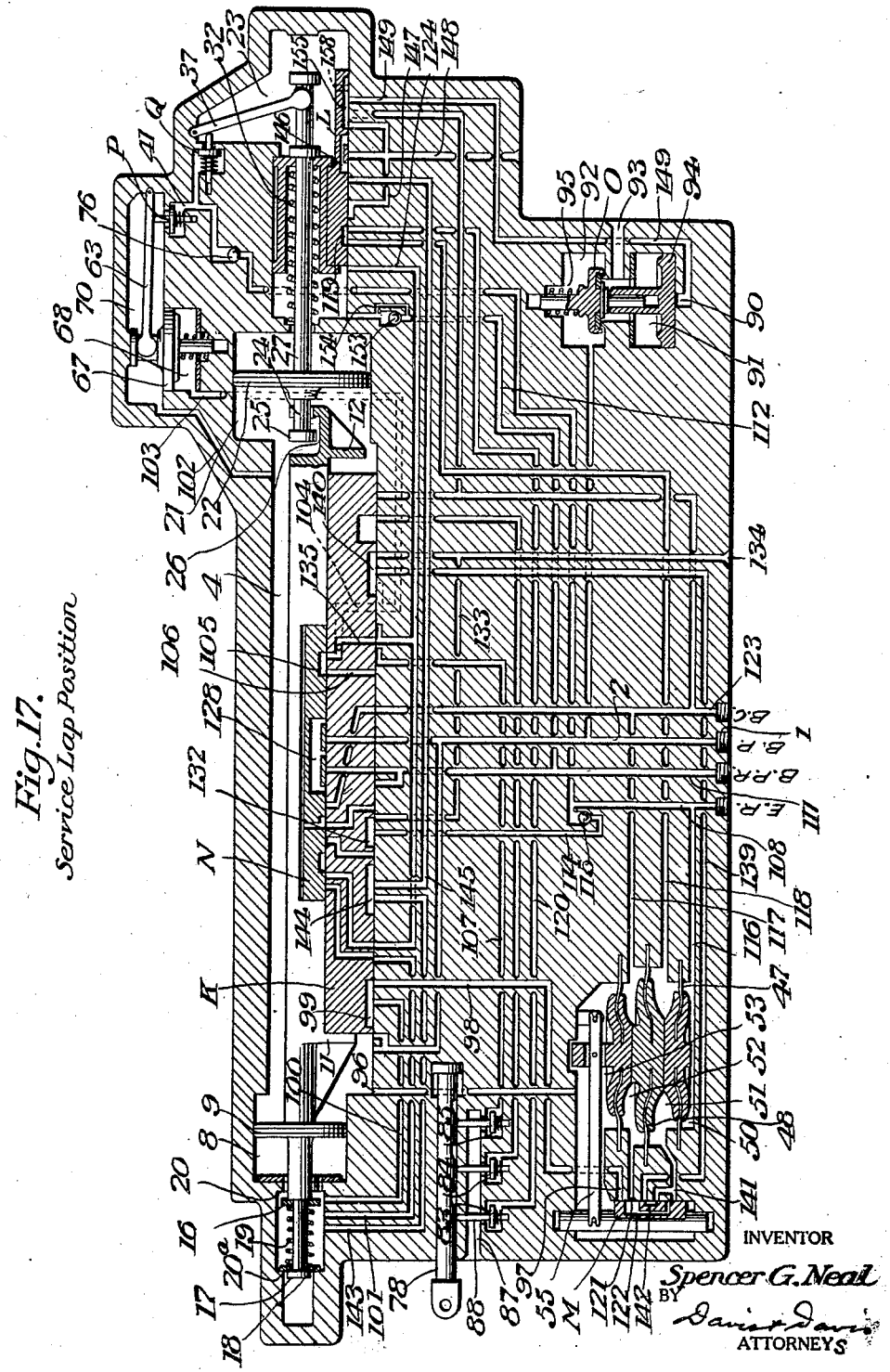

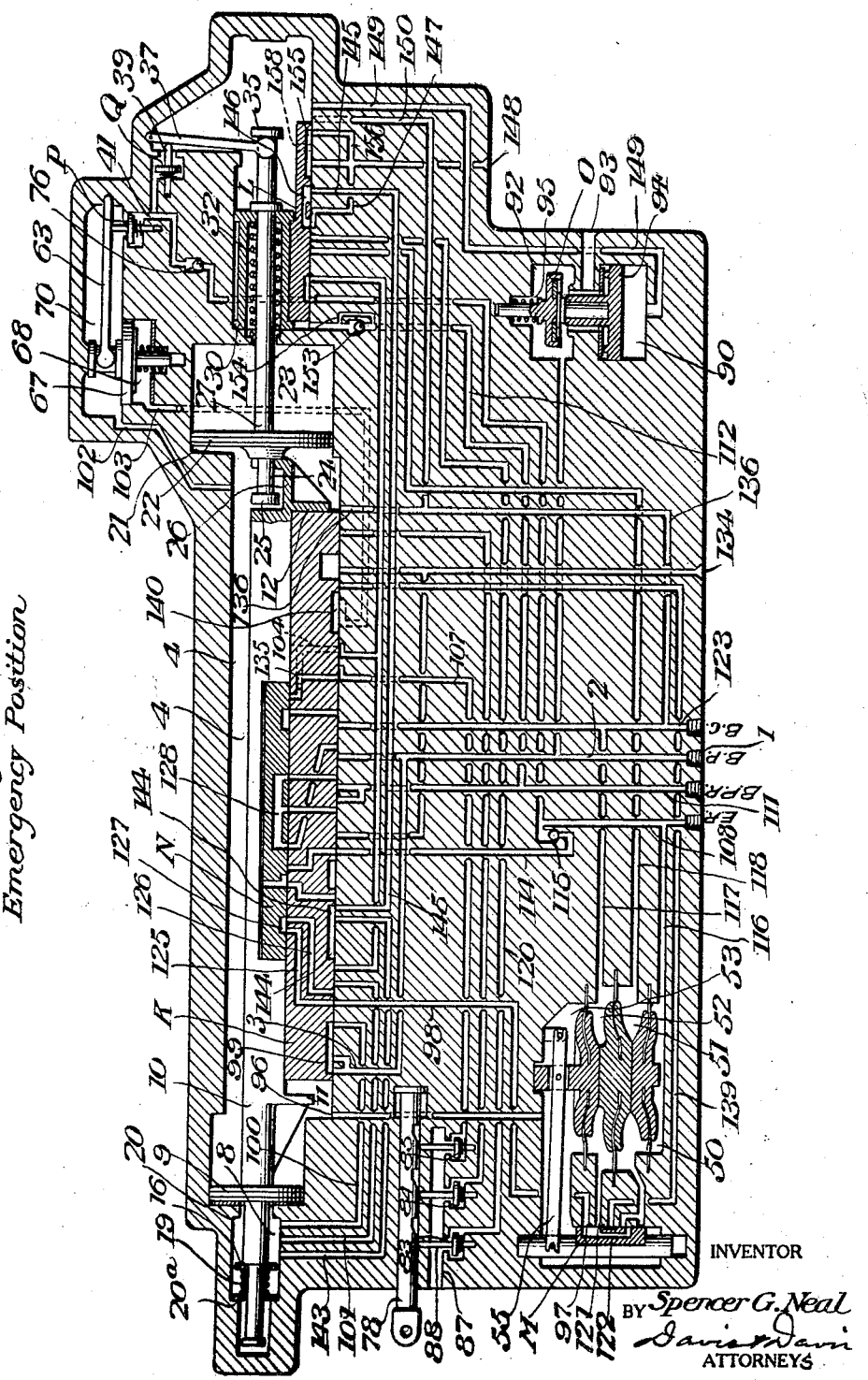

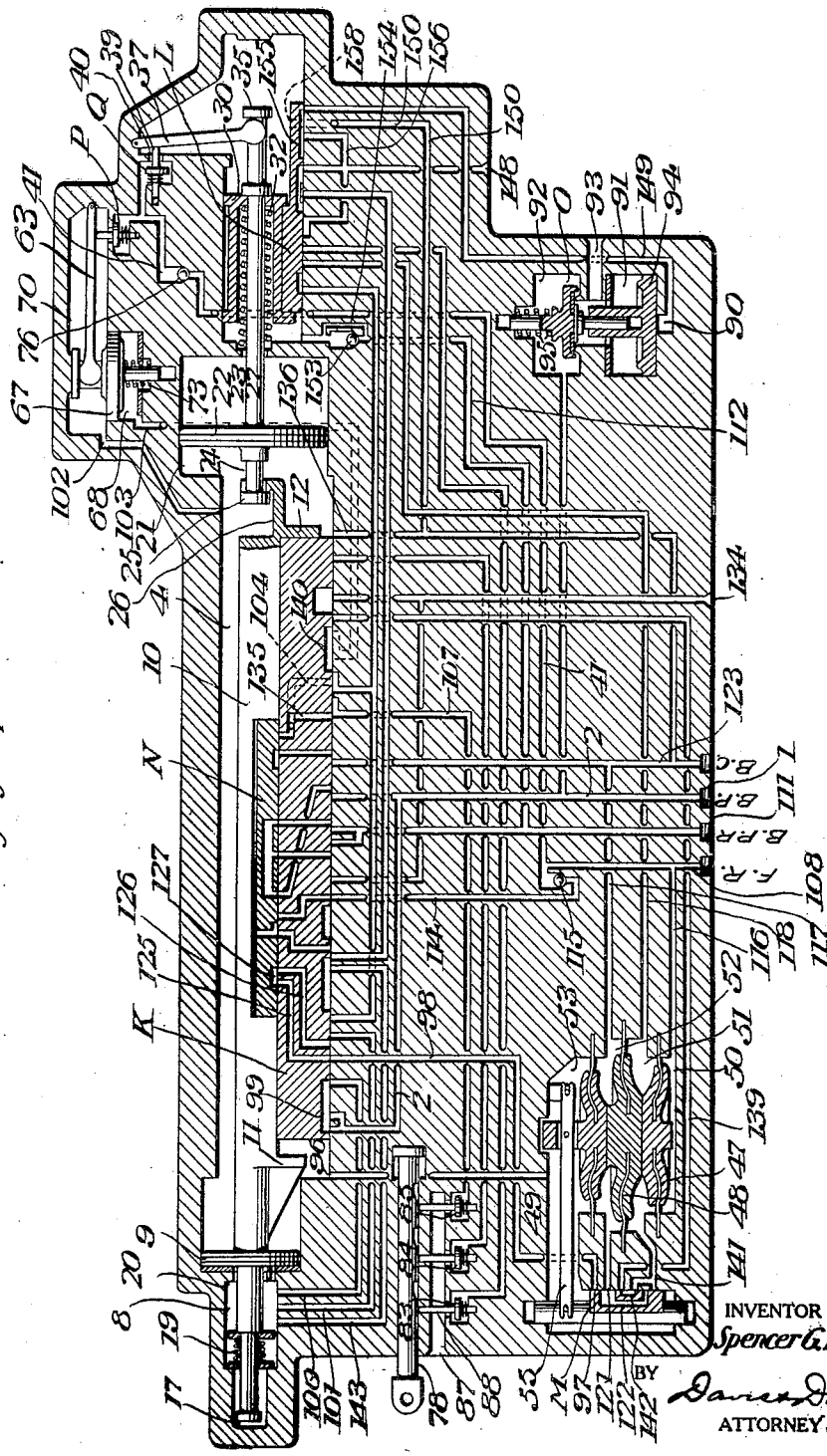

Patented July 22, 1924.

1,502,521

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed October 27, 1923. Serial No. 671,220.

*To all whom it may concern:*

Be it known that I, SPENCER G. NEAL, a citizen of the United States, and residing in the borough of Manhattan, city, county, and State of New York, have invented certain new and useful Improvements in Air-Brake Apparatus (Case No. 49), of which the following is a specification.

This invention relates to improvements in that type of air brake apparatus disclosed in my pending application, Serial #636,095, filed May 2, 1923. In the apparatus disclosed in said application the brake pipe volume is augmented by a brake pipe reservoir, air from said reservoir passing to the brake cylinder with air from the brake pipe during all service applications of the brakes so that the brake pipe reservoir contains brake pipe air at brake pipe pressure. It is a further characteristic of the apparatus disclosed in said application that the brake cylinder pressure controls the movement of the triple valve to lap position so that the brake cylinder pressure will be built up to the desired degree without regard to the length of piston travel or brake cylinder leaks.

The main object of this invention is to simplify and improve the construction of the apparatus disclosed in the aforesaid application for patent.

Another object of the invention is to simplify and improve the means for obtaining a quick release of the brakes.

A further object of the invention is to simplify and improve the means for obtaining an emergency application of the brakes, and to obtain rapid serial action of the triple valve throughout the train in emergency applications.

A further object of this invention is to provide a triple valve adapted for use in any and all sizes of brake cylinders and with any and all sizes of air reservoirs so that one standard form of triple valve may be used for all classes of service, both passenger and freight.

In the drawings:

Fig. 1 is a vertical sectional view of the triple valve taken on the line 1—1 of Fig. 3, a portion thereof being shown in side elevation;

Fig. 2 a face view of the flange of the triple valve which is bolted to the emergency reservoir;

Fig. 3 a plan view of the triple valve, a portion thereof being shown in horizontal sectional view, the section being taken on the line 3—3 of Fig. 1;

Fig. 4 a vertical sectional view taken on the line 4—4 of Fig. 3;

Fig. 5 a diagrammatic view showing the triple valve connected to an emergency reservoir, a brake pipe reservoir and a brake cylinder;

Fig. 6 a vertical sectional view taken on the line 6—6 of Fig. 3;

Fig. 7 a vertical sectional view taken on the line 7—7 of Fig. 1;

Fig. 8 a plan view of the main slide valve seat;

Fig. 9 a diagram of the ports of the main slide valve;

Fig. 10 a diagram of the ports of the graduating valve seat;

Fig. 11 a diagram of the ports of the graduating valve;

Fig. 12 a plan view of the emergency slide valve seat;

Fig. 13 a diagram of the ports of the emergency slide valve;

Fig. 14 a diagrammatic view of the triple valve showing the parts in full release and brake pipe reservoir charging position;

Fig. 15 a diagrammatic view showing the full release and emergency reservoir charging position;

Fig. 16 a diagrammatic view showing the service position;

Fig. 17 a diagrammatic view showing the service lap position;

Fig. 18 a diagrammatic view showing the emergency position;

Fig. 19 a diagrammatic view showing the emergency lap position; and

Fig. 20 a detail plan view of the restriction plate.

Referring to the various parts by reference characters, A designates the triple valve; B the emergency reservoir; C the brake cylinder and D the brake pipe reservoir. (See Fig. 5.)

The triple valve comprises a main body portion E which contains the main and graduating valves and the service piston; an emergency section F which contains the emergency slide valve, the release and emergency piston, the release governing valves, the emergency brake pipe vent valve, the quick release valve, and the emergency reservoir valve; and the controller section G which contains the means for operating the pilot valve and controlling the brake cylinder pressure.

J designates the brake pipe; K the main slide valve; L the emergency slide valve; M the pilot valve; N the graduating valve; and O the brake pipe vent valve. P designates the quick release valve which controls the discharge of emergency reservoir air into the main slide valve chamber and thence to the brake pipe for a quick serial release of the brakes. Q designates the emergency reservoir valve which controls the discharge of emergency reservoir air to the brake cylinder for an emergency application of the brakes.

In order to simplify the description, the structural arrangement of the various parts will be first described, and then the various ports, passages and valves and their functions and movements will be described in detail in connection with the several valve operations. In the drawings illustrating the general construction and arrangement of the triple valve, the ports and passages have been omitted in order to simplify the drawings and prevent confusion. The ports and passages are illustrated diagrammatically in Figs. 14 to 19 and have been illustrated correctly in Figs. 8 to 13 inclusive. In view of the full illustrations of the ports and passages in the detail views it is though unnecessary to attempt to illustrate them in the views showing the construction and arrangement of the parts of the triple valve.

The main body part E (see Figs. 1 to 7) of the triple valve is provided with a brake pipe port 1 which is in direct communication through a passage 2 with a port 3 in the main slide valve seat, passage 2 thereby placing the brake pipe in direct communication with the main brake pipe chamber 4, said chamber also constituting the main slide valve chamber. In the chamber 4 is arranged a bushing 5 in which is formed the main slide valve seat 6, the main slide valve K operating on said seat and being held in position thereon by means of a spring 7 carried by the main slide valve and bearing on the inner surface of the bushing directly over the valve. In the main body portion E of the triple valve is also formed a supplemental brake pipe chamber 8 at one end of the main brake pipe chamber 4. The chamber 8 is cylindrical and is provided with a bushing in which reciprocates a service piston 9, said piston serving as a movable abutment separating the main brake pipe chamber 4 from the supplemental brake pipe chamber 8. Connected rigidly to the service piston 9 and extending centrally through the main brake pipe chamber 4 is a valve stem 10 which carries two abutments 11 and 12 which are adapted to engage the ends of the main slide valve. The distance between said abutments is greater than the length of the main slide valve so that the valve stem may have a certain limited movement independently of the main slide valve. The valve stem 10 is cut out to receive the graduating valve N so that the said valve will move positively with the stem. The graduating valve operates on the upper surface of the main slide valve and is held yieldingly in engagement therewith by any suitable spring arrangement. The outer end of the supplemental brake pipe chamber 8 is closed by a suitable head 13 which carries an inwardly extending centrally located rigid stem 14. This stem extends into a hollow end portion of the stem 10 and is provided with a head 15 at its inner end. The head 15 serves as a stop for a loose collar 16 which is slidably mounted on the stem 14. The end of the hollow portion of the valve stem 10 is closed by a cap 17, said cap serving as a stop for a collar 18 mounted on the stem 14. Surrounding the stem 14 between the collars 16 and 18 is a coil spring 19, the hollow portion of the stem 10 serving as a housing to enclose the said spring. The inner end of the hollow portion of the stem is reduced to form a shoulder 20 against which the collar 16 is adapted to abut when the main slide valve is moved to application position. The collar 18 is adapted to engage an abutment $20^a$ fixed to the head 13 when the service piston moves to application position. The portion E of the triple valve is attached to the emergency section F by means of a flange E'. To the under side of the main body portion E is secured a connection plate $E^2$ and to this plate is connected the brake pipe J and the brake pipe reservoir pipe D'. The plate $E^2$ is formed with a port which directly connects with the brake pipe port 1. It is also provided with a port which connects directly to the brake pipe reservoir passage 111. This plate is also provided with ports and passages which communicate with the brake cylinder and with the emergency reservoir. Between the connection plate $E^2$ and the part E of the triple valve is interposed a restriction plate R said plate being provided with ports corresponding to and registering with the ports in the connection plate. By interposing a restriction plate having ports of the desired size or capacity the triple valve may be adapted for use with brake cylinders and air reservoirs of the desired size. The connection plate $E^2$ is of standard construction having maximum capacity ports and passages.

The emergency section F is secured to the flange E' of the main body portion E and is provided with a piston chamber 21 which at one side is in open communication with the main brake pipe chamber 4. In this piston chamber is arranged a release and emergency piston 22 which is considerably larger in diameter than the service piston 9, said two pistons being axially in line with each other. In the emergency section is also formed an emergency valve chamber 23 which is in communication with the piston chamber 21, the piston 22 forming a movable abutment separating the emergency valve chamber 23 from the main brake pipe chamber 4 so that the air pressure in the main brake pipe chamber 4 will operate on one side of the release and emergency piston and the air pressure in the emergency valve chamber 23 will operate on the other side of said piston. That side of the piston 22 which is exposed to the air pressure in the main brake pipe chamber 4 might be termed the release side of the piston, and that side which is exposed to the air pressure in the emergency valve chamber might be termed the emergency side of said piston. The piston 22 is formed with a releasing stem 24 which extends into the main brake pipe chamber 4 and is formed with a head 25. The main slide valve stem 10 is formed with an open yoke 26 adjacent the abutment 12, said yoke loosely engaging the release stem 24 and being loosely interlocked with the head 25. The purpose of this loose connection is to permit the piston 22 to move the main slide valve to release position and at the same time permit the piston 22 and the main slide valve to have movements independently of each other during service and emergency operations, but more particularly to permit the piston 22 and the emergency valve to have an independent movement to emergency lap position. The release and emergency piston is larger than the service piston so that an increase in brake pipe pressure in the main brake pipe chamber 4 will move the piston 22 toward the right hand as viewed in Figs. 1 and 14 to 19 and carry the main slide valve to release and charging position as will be more fully hereinafter described.

The release and emergency piston 22 is formed with a central guide stem 27 which extends outwardly through the emergency valve chamber 23, said stem fitting a tubular guide post 27ª. In the emergency valve chamber is arranged a bushing 28 in which is formed an emergency valve seat 29 on which the emergency valve L operates. The emergency valve is held in position on its seat by a tubular guide 30, said guide surrounding the stem 27 and its guide post and carrying depending abutments 31 between which the emergency valve is held. Surrounding the guide post 27ª is a coil emergency spring 32, said spring being confined between the closed outer end of the guide 30 and a stop collar 33 on the end of the guide post 27ª. The inner wall of the emergency valve chamber is adapted to be engaged by the guide 30 to stop the emergency valve in its normal position, said valve remaining in said normal position at all times except when it is moved into emergency position. The guide 30 is provided with two flanged extensions 34 which extend toward the piston 22. The piston 22 is provided with two flanged extensions 35 which extend toward the guide 30, said extensions 34 and 35 interlocking, as shown in Fig. 1, there being a slight space between the said interlocking flanges to permit the piston 22 to have a slight movement independently of the guide 30. When the piston is moved the desired distance toward the main brake pipe chamber, that is to say toward application position, the flanged extensions will be engaged and thereafter the guide 30 and the emergency slide valve will move with the piston 22. This movement of the emergency slide valve occurs only when piston 22 is moving to emergency position. When the main slide valve is moved to service application position the flanged extensions 34 and 35 will be engaged and the emergency spring will then serve as an additional means for stopping the main slide valve in service position, as will be more fully hereinafter described.

In the emergency valve chamber an emergency lever 37 is pivoted at 36, one arm of said lever being formed into a yoke which straddles the emergency spring and bears against the inner face of the tubular guide 30. The other arm of said lever carries a valve operating pin 38 which is adapted to engage a projecting stem 39 secured to the emergency reservoir valve Q. Valve Q controls a port 40 which is in communication with a passage 41. Valve Q seats downwardly and is held firmly on its seat by pressure in passage 41. When the piston 22 is moved inwardly to emergency position the lever 37 will force the valve Q from its seat and thereby place passage 41 in communication with the emergency valve chamber 23. Passage 41 is in direct communication with the emergency reservoir as will be hereinafter described. In the emergency position of the emergency slide valve L the chamber 23 is in direct communication with the brake cylinder. The emergency section F is provided with a circular flange F' by means of which the triple valve is bolted to the emergency reservoir and the emergency reservoir is in communication with the ports and passages of the triple valve through a port which leads through said flange. The brake cylinder is also in communication with the proper ports and passages of the triple valve through a port which leads through said flange.

The controller section G of the triple valve is mounted on the under side of the emergency section F and consists of rings 43 and 44, an upper chamber plate 45, and a lower closure plate 46, all of said parts being bolted together. The upper chamber plate is formed with lateral horizontal flanges G' by means of which the controller section is bolted to the emergency section. Between the rings 43 and 44 and the lower closure plate 46 are arranged diaphragms 47, 48 and 49, said diaphragms forming chambers 50, 51, 52 and 53. The inner portions of the diaphragms are supported by circular clamping members all of which are rigidly connected together and to a central post so that all of said diaphragms move together. The central supporting members are only slightly smaller in diameter than the chambers in which they are located so that there is only a slight portion of each diaphragm unsupported and exposed to air pressure. This unsupported portion of each diaphragm is bridged by a bridge ring 42 which is formed with marginal flanges which seat on annular shoulders formed on the rings and on the supporting members. The inner margins of these bridge rings move with the diaphragm supporting members while the outer margins thereof remain in contact with the shoulder on the rigid supporting rings. The diaphragms are each formed with an annular rib $42^a$ which is adapted to engage its co-operating bridge ring. Chamber 50 constitutes an emergency reservoir chamber and is in communication with an emergency reservoir. Chamber 51 constitutes a pressure retention chamber. Chamber 52 is the brake cylinder controlling chamber and is in direct communication with the brake cylinder. Chamber 53 is the actuating chamber and is in communication with the main brake pipe chamber 4 and through said chamber with the brake pipe, said communication being open to the brake pipe at all times, except when the main slide valve has been moved to emergency position. The central supporting member of the diaphragm structure is adapted to contact with the plate 46 to limit the downward movement of the diaphragms. The upper supporting member of the diaphragm 47 is adapted to contact with an annular shoulder 54 to limit the upward travel of the diaphragms.

Pivotally mounted in the chamber 53 is a pilot valve lever 55, said lever being mounted on one end on a pivot 56 and being connected by a pin 57 to the upper end of the central stem of the diaphragm structure. The free end of the pilot valve lever is connected by a rod 58 to a guide 59 which carries the pilot valve M. The guide 59 operates in a bushing 60 mounted in a chamber 61 formed in the plate 46 and in open communication with the actuating chamber through passage 62, the operating rod 58 extending through said aperture. The controlling diaphragm 48, which is subject to brake cylinder pressure in the brake cylinder control chamber 52, is larger in diameter than the actuating diaphragm 49 and the emergency diaphragm 47, the actuating diaphragm and the emergency diaphragm being of equal diameter. The pilot valve M is held yieldingly in lap position by spring $59^a$, said spring being compressed when the pilot valve is moved to application position, and the guide 59 moving away from said spring when the pilot valve is moved to release position so that the said spring serves as a means for stopping the pilot valve both in release lap and service lap positions.

In a chamber 70 formed in the emergency section F is pivotally mounted a quick release lever 63, said lever being connected by a yoke 65 with a stem 66 of a quick release piston 67. The piston 67 is mounted in a chamber 68 formed in the emergency section F, said chamber 68 being connected by a passage 103 to a port in the main slide valve seat. The chamber 70 is in open communication with the main brake pipe chamber 4 through passage 102. A portion of the chamber 70 is formed by an enlargement of the flange E' of the main slide valve section E. The quick release piston 67 is provided with a guide stem 72 and said piston moves inwardly in quick release operations when the chamber 68 is exhausted to atmosphere through the main slide valve and the release governing valves, as will be hereinafter described. The quick release valve P controls a port between the emergency reservoir passage 41 and the chamber 70. The stem of this valve extends into the chamber 70 and is adapted to be engaged by the upper arm of the lever 63 so that when the piston 67 moves inwardly the valve P will be lifted from its seat and emergency reservoir air may flow from passage 41 into chamber 70 and thence directly into the main brake pipe chamber 4. The quick release valve P is held to its seat by a spring 74. The passage 41 is connected to the emergency reservoir and in said passage is arranged a check valve 76 which is adapted to be seated by any pressure flowing from chamber 70 around valve P but which may be freely unseated by emergency reservoir pressure flowing through passage 41 into chamber 70 or into chamber 23.

In the emergency section F are arranged three release governing check valves 83, 84 and 85, said valves being arranged directly in line with each other and seating downwardly on bushings arranged in the upper surface of the section F. These valves control ports which lead into a common atmospheric discharge port 87 and are each held to its seat by a spring 86. These three valves control the quick release and the graduated release operations of the triple valve, being opened when the triple valve is operated in quick release and closed when it is operated in graduated release, as will be fully hereinafter described. In the section F axially in line with the valves 83, 84 and 85 are valve opening plungers 88, the inner lower ends of which extend into a passage 77 in which is arranged a slidable release governing bar 78. The bar 78 is recessed at 79 to receive the ends of the plungers, and one wall of each recess is inclined to form a cam 80. When the bar 78 is pulled outwardly, as shown in Fig. 4, the plungers fit in the recesses 79 and the valves are closed by their springs. This is the position of the parts when the triple valve is operating in graduated release. It is manifest that by sliding the bar 78 inwardly cams 80 will move the plungers and force the release governing valves from their seats. This is the quick release position of the parts.

In the emergency section F is formed a chamber 89 in which the brake pipe vent valve O is mounted. This chamber is divided into a lower piston chamber 90; an intermediate exhaust chamber 91; and an upper brake pipe chamber 92. The vent valve O seats downwardly and closes a large port between the brake pipe chamber 92 and the exhaust chamber 91, said chamber being directly connected to atmosphere through a large exhaust port 93. The brake pipe chamber 92 is directly connected to the brake pipe, and the piston chamber 90 is connected to a port in the emergency valve seat so that when the emergency valve goes to emergency position emergency reservoir air will flow into chamber 90. In this chamber 90 is arranged a piston 94 having an upwardly extending tubular stem which receives a downwardly extending stem carried by the vent valve O. The vent valve O is held to its seat by a spring 95. When the piston 94 is moved upwardly the vent valve will be unseated and the brake pipe will be connected directly to the large exhaust port 93. This port 93 is of greater capacity than the brake pipe in order to secure a rapid discharge of brake pipe air to atmosphere in emergency applications and thereby bring about a very rapid serial action of all the triple valves in the train.

All of the vent valves and release governing valves are arranged to seat downwardly on seats mounted in or on the upper face of the emergency section F of the triple valve. These valves are all enclosed by a cap plate 81 in which suitable chambers and passages are formed. It is therefore manifest that by removing the plate 81 access may be had to all of these valves.

*Brake pipe reservoir charging position (Fig. 14).*

To charge the system from zero pressure, the brake valve on the locomotive is operated in the usual manner, that is, placing the brake valve in full release position to admit main reservoir pressure to the brake pipe. The air pressure thus admitted to the brake pipe enters the triple valve at the brake pipe connection 1, and flows therefrom through passage 2 and port 3 to chamber 4. From chamber 4 the brake pipe pressure flows to chamber 53 of the diaphragm section through passage 96, and the diaphragms are operated to their lowermost position as shown in Fig. 14, uncovering port 97 of the pilot valve seat, and permitting the pressure from chamber 53 to flow to chamber 8 at the left side of the small service piston 9, through passage 98, cavity 99 of the main slide valve, and passages 100 and 101. This communication permits an equalization of pressure on both sides of piston 9, causing this piston to become inoperative, and in turn allows the larger piston 22 to operate the main slide valve and the graduating valve to the extreme right against zero pressure in the emergency valve chamber 23. The increasing brake pipe pressure is also registered in chamber 92, above the emergency brake pipe pressure vent valve O. Chamber 70 above the quick release piston 67 is in direct communication with chamber 4 through passage 102, and registers brake pipe pressure therein during this position of the triple valve. The pressure in chamber 70 operates piston 67 to the position shown, thus opening the quick release valve P, because at this time chamber 68 is vented to atmosphere through passage 103 in the valve body, passage 104 in the main slide valve, cavity 105 of the graduating valve, passage 106 of the main slide valve, and passage 107 in the valve body. The latter passage is open to atmospheric discharge port 87 when the release governing valve 85 is open. When the valve 85 is closed, as when operating in graduated release, the quick release piston 67 will not assume the position shown in Figure 14, because the pressure in chamber 68 is not vented to atmosphere. Even though valve P may be open as shown, check valve 76 prevents the brake pipe pressure from flowing to the emergency reservoir. Without this check valve in passage 41, the brake pipe pressure would flow direct to the emergency reservoir through this passage, which leads direct to the emergency reservoir connection 108. In this position of the triple valve, the brake pipe reservoir is charged from chamber 4 through port 109 of the graduating valve, passage 110 of the main slide valve, and passage 111 of the valve body. The pressure thus slowly flowing to the brake pipe reservoir will, after a given period of time, completely equalize with the brake pipe pressure, thereby causing a complete equalization of pressure in chambers 4 and 23, on opposite sides of piston 22, as the latter chamber is in direct communication with the brake pipe reservoir through passages 112 and 111. When this equalization occurs, the graduating spring 19 will operate pistons 9 and 22 together with the graduating valve N to the left. The movement of the graduating valve to the left closes communication between port 109 of the graduating valve and passage 110 of the main slide valve, and cuts off communication between the brake pipe and the brake pipe reservoir; this movement of the graduating valve to the left is governed by the distance between the graduating spring washer 17 and the shoulder 20$^a$, located on the stem 14. This distance is the equivalent of the distance between the abutment 12 located at the right of the slide valve operating stem 10, and the right end of the main slide valve. Thus it will be seen that the graduating valve may be operated this distance without any movement of the main slide valve and assume emergency reservoir charging position.

Emergency reservoir charging position (Fig. 15.)

In this position of the triple valve, communication is cut off between passages 104 and 106 of the main slide valve, as cavity 105 of the graduating valve is out of register with passage 104, thus closing communication between chamber 68 and atmosphere. The leakage past piston 67, which is not provided with a piston ring, will result in an equalization of pressure on both sides of said piston, permitting the replacing spring 73 to operate it to the position shown in Figure 15, thereby closing the quick release valve P. This position of the triple valve permits the emergency reservoir to be charged from chamber 4 through the port 109 of the graduating valve, passage 113 of the main slide valve and passage 114 of the valve body. From passage 114 air pressure flows past the non-return check valve 115 and direct to the emergency reservoir through passage 108. The chamber 50 beneath the diaphragm 47 will be increased with the increase of pressure in the emergency reservoir, as this chamber is in direct communication with the emergency reservoir through passage 116. Air pressure will continue to flow to the emergency reservoir until a complete equalization occurs between the brake pipe and the emergency reservoir at which time both the brake pipe reservoir and the emergency reservoir pressures are at an equality with the brake pipe pressure and the system will be fully charged preparatory to a service brake application. It will be noted that there is not at this time communication between chamber 4 and the brake pipe reservoir because port 109 of the graduating valve is out of register with port 110 of the main slide valve. Should the brake pipe reservoir pressure leak slightly below the brake pipe pressure the pressure in chamber 23 will likewise be reduced, with the result that piston 22 will operate to the right against the resistance of graduating spring 19 and the graduating valve will be operated to a position that will permit port 109 of the graduating valve to communicate with ports 110 and 113 of the main slide valve. This dual communication is an assurance that both the brake pipe reservoir and the emergency reservoir are charged to a full equality with the brake pipe. The purpose of this communication will be clearly set forth in the description of the service operation of the triple valve.

Service position (Fig. 16)

When the system has been fully charged as described in emergency reservoir charging position the pressures in chambers 53 and 50 of the diaphragm section are equal and there is no pressure in chamber 52 between the brake pipe pressure diaphragm 49 and the equilization diaphragm 48, as there is direct communication between the brake cylinder and chamber 52 through passage 117, the brake cylinder at this time being in direct communication with the atmosphere. Neither is there any pressure in atmosphere chamber 51 as this chamber when operating the triple valve in quick release is vented to atmosphere through passage 118, cavity 119 of the emergency slide valve, passage 120 and past the release governing valve 83. When a service brake application is desired the usual reduction of brake pipe pressure is made, resulting in a similar reduction of pressure in chamber 4, and likewise in chamber 53 above the brake pipe pressure diaphragm 49, with the result that the undisturbed emergency reservoir pressure in chamber 50 will then predominate over that in chamber 53. The diaphragms will then operate to service position carrying with them the pilot valve M which is operatively connected to the diaphragms by lever 55. This position of pilot valve M affords free communication between passages 98 and 121, by way of cavity 122 of the pilot valve. This communication will release the pressure in chamber 8 at the left side of the service piston 9 below the brake pipe pressure in chamber 4, the air from chamber 8 flowing direct to the brake cylinder as follows: passage 100, cavity 99 of the main slide valve, passage 98, cavity 122 of the pilot valve, passage 121, chamber 52 and passages 117 and 123.

This reduction of pressure in chamber 8 below that in chamber 4 will operate the pistons 9 and 22 and the main slide valve to the left and assume service position. When the main slide valve has reached service position communication with the brake pipe reservoir and chamber 8 is obtained, the object being to establish a sufficient equalization on both sides of the service piston 9 to permit the graduating spring 19 to positively stop the main slide valve in full service position. The communication between the brake pipe reservoir, chamber 23 and chamber 8 is established through passage 124, passages 125 and 126 of the main slide valve which are connected by cavity 127 of the graduating valve, and passage 101 in the valve body. As a further prevention against undesired emergency operation the stop 35 of the emergency piston engages the tubular guide 30, and the head 25 at the left end of the emergency piston stem 24 engages the right end of the valve stem 10. The engagement of these parts makes it necessary to compress the emergency spring 32 before it will be possible to assume emergency position. An emergency application cannot be obtained until the brake pipe pressure has been reduced at an emergency rate, and it is this rate of brake pipe pressure reduction only that will compress spring 32. In this position of the triple valve the mixing chamber 128 is in communication with the passages 129, 130 and 131 of the main slide valve; passage 129 being in communication with the brake pipe through passage 2, passage 130 being in direct communication with the brake pipe reservoir through passage 111, and passage 131 being in direct communication with the brake cylinder through passage 123. Thus is will be seen that as both the brake pipe and brake pipe reservoir pressures are admitted to the mixing chamber 128 as described, both of these pressures will flow from this mixing chamber to the brake cylinder through passage 131 of the main slide valve and passage 123. This communication will remain established so long as the pilot valve is in service position, which will in turn hold the pressure in the chamber 8 sufficiently below that in chamber 4 to maintain the graduating valve in service position.

It is understood that the pressure in chamber 53 is of a lesser amount (because of the brake pipe reduction) than that in chamber 50, which has been held sealed by the charging check valve 115, and that before the pilot valve can assume service lap position an energy must be created from some other source to the equivalent of that which is lacking in chamber 53 to oppose the undisturbed emergency reservoir pressure in chamber 50. This needed energy is created through the medium of the brake cylinder pressure developed in chamber 52 acting upon the differential areas of diaphragms 49 and 48. As the area of diaphragm 48 is larger than the area of diaphragm 49, diaphragm 48 will necessarily create a greater downward energy than the opposing upward energy created on diaphragm 49. The areas of these two diaphragms are so proportioned that when 2½ lbs. has been developed in the brake-cylinder for each 1 lb. reduction of brake pipe pressure in chamber 53, below the undisturbed emergency reservoir pressure in chamber 50, the pilot valve assumes lap position. For example: Should the brake pipe pressure be reduced 10 lbs., the pilot valve will remain in service position until 25 lbs. pressure has been built up in the brake cylinder, a ratio of 2½ to 1, or as stated, a development of 2½ lbs. pressure in the brake cylinder for each 1 lb. reduction in the brake pipe pressure.

To assure a positive and firm seating of the emergency reservoir charging check valve 115, the pressure in passage 114 beneath this check valve is vented to atmosphere through cavity 132 of the main slide valve and passages 133 and 134.

*Service lap position (Fig. 17).*

When the required brake cylinder pressure has been developed in equalizing chamber 52, which is in direct communication with the brake cylinder, the pilot valve assumes lap position, because the pressure in chamber 52 acting against the large area of the diaphragm 48 will augment the energy in chamber 53, which has previously been reduced by the brake pipe reduction. When the pilot valve assumes lap position communication is cut off between passages 98 and 121 thereby stopping the reduction of pressure in chamber 8 at the left side of piston 9. When this operation takes place, the brake pipe reservoir pressure, which is in communication with chamber 8 at this time through ports and passages previously described, causes an immediate equalization of pressure on both sides of piston 9, because both the brake pipe and the brake pipe reservoir pressures are at an equality at this time. This equalization will permit the graduating spring 19 to operate pistons 9 and 22, together with the graduating valve N to the right. This movement is limited by the distance between the graduating spring washer 18 and the head 17 at the extreme left of the stem 14. During this movement the main slide valve will not be disturbed, but the ports which were supplying pressure to the brake cylinder from the mixing chamber 128 will be cut off and there will be no further development of brake cylinder pressure. However, should the brake cylinder pressure leak to atmosphere, the pressure in chamber 52 of the diaphragm section will likewise be reduced with the result that the pilot valve will again be operated to service position because the required energy in chamber 52, which assists the energy in chamber 53 to oppose the undisturbed emergency reservoir pressure in chamber 50 has been so depleted that the pressure in chamber 50 will predominate. With the pilot valve in this position a reduction of pressure will again take place in chamber 8 and the graduating valve will again assume service position to replenish the brake cylinder pressure to the necessary degree to cause the pilot valve to again assume lap position.

Release while operating in quick release position.

To effect a release of the brakes, the brake pipe pressure is increased in the usual manner, which will result in a corresponding increase in pressure in chambers 4 and 53. The increase of brake pipe pressure in chamber 53 operates the pilot valve to release position, thereby admitting brake pipe pressure through passage 98 to chamber 8, and the increase in pressure in chamber 4 above that in the chamber 23, which is at this time sealed from the brake pipe by the main slide valve, operates the main slide valve toward release position. The main slide valve can operate toward release position without any spring resistance until the graduating spring washer 16 engages the shoulder 20. During this movement, the brake pipe reservoir pressure in chamber 23 is released to atmosphere in an amount that will cause a sufficient differential of pressure between the increasing brake pipe pressure in chamber 4 and the decreasing brake pipe reservoir pressure in chamber 23 to positively operate the triple valve to release position. The communication between chamber 23, and the atmosphere is as follows: passage 124 of the valve body, passage 135 of the main slide valve, cavity 105 of the graduating valve, passage 106 of the main slide valve, and through passage 107 to the atmosphere, the valve 85 when operating in quick release being open. It will be noted when referring to Figure 17 that the passage 106 in the main slide valve is out of communication with passage 107, but when this free movement above referred to takes place, communication is established between passages 106 and 107. This reduction of pressure between the chamber 23 and the atmosphere likewise takes place in chamber 68 beneath the quick release piston 67, with the result that this piston will assume the position shown in Figure 14, which will open the quick release valve P. The operation of valve P permits the release of the previously undisturbed emergency reservoir pressure to chamber 4, by way of passage 41, chamber 70 and passage 102 for the purpose of increasing the pressure in chamber 4 to positively operate the parts of the triple valve to full release position. In release position the brake cylinder pressure is exhausted to atmosphere through passage 123, passage 136, cavity 137 of the main slide valve, through passage 138 of the valve body and past the quick release valve 84 (see Figure 14). While in release position as above described, the system will again be charged as previously described, under full release and brake pipe reservoir charging position.

Graduated release operation.

The present triple valve is designed to be operated in graduated release in grade braking, where retainers are now used with Westinghouse equipment. To accomplish this result the operating stem 78 which controls the release governing check valves 83, 84 and 85 is manually operated to the left, this position permitting the guide stems of these valves to enter the recesses in stem 78. The closing of valve 85 prevents the release of the brake pipe reservoir pressure in chamber 23 to atmosphere, and likewise the release of the pressure beneath the quick release piston 67. Check valve 84 prevents the release of the brake cylinder pressure by way of the main slide valve, the release of brake cylinder pressure being controlled entirely by the pilot valve when the triple valve is operating in graduated release position. When valve 83 is closed, the release of pressure to atmosphere from chamber 51 between diaphragms 47 and 48 is prevented. A service application of the brakes when operating in graduated release position is accomplished precisely as described under service position with the valves 83, 84 and 85 open. The only functional differences in the operation of the triple valve when operated in graduated release as compared with quick release, is in the control of the brake cylinder pressure, particularly while releasing the brake cylinder pressure, and the maintenance of the emergency reservoir pressure during all positions of the triple valve other than emergency. When the brake pipe pressure is increased the emergency reservoir pressure is not released to the brake pipe, as when operating in quick release, but is sealed and maintained during all service operations. Assume that a 20 pound brake pipe reduction has been made from an initial brake pipe pressure of 70 pounds and that a full service brake cylinder pressure has been developed (50 pounds). At this time there will be a pressure of 50 pounds in chambers 53 and 52, and pilot valve M will be in lap position. If it is desired to partially release the brake cylinder pressure, the brake pipe pressure is increased in chamber 53 and the combined pressure in chamber 53 and chamber 52 will then predominate over the undisturbed emergency reservoir pressure in chamber 50. Under these conditions, the pilot valve will operate to release position as shown in Figures 14 and 15. With the pilot valve in this position, the brake cylinder pressure will be released to atmosphere slowly through passages 123 and 117, the equalizing chamber 52, passage 121, cavity 122 of the pilot valve, passage 139, cavity 140 of the main slide valve and passage 134. As previously stated, the reduction of the brake cylinder pressure is quite slow when operating in graduated release, and while the pilot valve is in release position brake cylinder pressure is registered in chamber 51 between diaphragms 47 and 48. When operating a train wholly equipped with the present triple valve or with such valves in the majority, the pilot valve will be in lap position the greater part of the time with the result that the pressure in chamber 51 will be vented to atmosphere through passage 141, cavity 122 in the pilot valve, and passage 139, which leads direct to the atmosphere, by way of the cavity 140 in the main slide valve and passage 134. Under these conditions, the brake cylinder pressure fluctuations are in practically direct proportion to the increase and decrease of the brake pipe pressure.

When operating a train of mixed equipment with the present triple valve in the minority and ordinary Westinghouse triple valves in the majority it is desirable to use the cycling method of braking when operating on grades. When operating with the cycling method the frequency of the cycles depends upon the grade and the amount of pressure retained in chamber 51 depends upon the frequency of the cycles. On steep grades greater pressure will be built up in chamber 51 than when operating on slight grades. This feature of my present invention is fully described and claimed in my co-pending application, Serial No. 640,893, filed May 23, 1923.

*Emergency position (Fig. 18).*

To obtain an emergency application of the brakes a brake pipe reduction is made at an emergency rate through the engineer's brake valve. This rate of brake pipe reduction, registered in chamber 4, will deplete the pressure therein faster than it is possible to deplete the pressure in chamber 23. This difference in the rate of reduction of pressures in chambers 4 and 23 will establish a differential in pressure on both sides of piston 22 that will oppose the resistance of the emergency spring 32, and the piston 22 and the emergency slide valve L will be operated to the left toward emergency position, as shown in Figure 18. When the piston 22 has moved only a short distance toward emergency position, the lever 37 will open the emergency reservoir valve Q. The opening of valve Q will admit the high emergency reservoir pressure to chamber 23 past check valve 76 located in passage 41. The admission of this high emergency reservoir pressure to chamber 23 will further increase the pressure in said chamber above that in chamber 4, with the result that the piston 22 and the emergency slide valve L will be positively operated to emergency position, as shown in Figure 18. At the start of the emergency brake pipe reduction, a reduction of pressure in chamber 4 will likewise be registered in chamber 53 of the diaphragm section. Should an emergency application of the brakes be made with the brakes fully released or after a service brake pipe reduction, the pilot valve will be operated toward service position; but should an emergency application be made after a full service brake pipe reduction, the pilot valve M during emergency operation of the main parts of the triple valve will remain in lap position. In any event, the position of the pilot valve will not interfere with the emergency operation of the triple valve, because the emergency piston 22 and the emergency slide valve L which is actuated by this piston are operated to emergency position without any assistance of other parts in the triple valve. When the emergency slide valve assumes emergency position, the pressure in chamber 8 at the left side of the service piston 9 is vented directly to atmosphere through passage 143, cavity 144 of the main slide valve, passage 145, cavity 146 of the emergency slide valve, passage 147, and then direct to the atmosphere through passage 148. The release of the pressure from chamber 8, assisted by the engagement of the piston 22, with the end of the stem 10, will operate the main and graduating valves quickly and positively to emergency position, and passages 149 and 150 will then be uncovered by the emergency slide valve and the pressure admitted to chamber 23 from the emergency reservoir (and under certain conditions the pressure from the brake pipe reservoir which enters chamber 23 through passage 112) will be free to flow thereto. This high pressure thus entering passage 149 will flow to chamber 90 below the emergency vent piston 94. The area of this piston is greater than the area of the emergency brake pipe vent valve O, which will cause the pressure admitted to chamber 90 against the area of piston 94 to oppose the pressure in chamber 92 above the valve O. The valve O will then be operated to open position as shown in Figure 18, and the brake pipe pressure will be vented direct to atmosphere from chamber 92 (which is in direct communication with the brake pipe) past emergency brake pipe vent valve O and passage 93 which leads direct to the atmosphere. The object of venting the brake pipe pressure to atmosphere as described is to quickly and positively propagate emergency brake action throughout a long train. With this triple valve, the extreme has been reached with respect to the local brake pipe reduction at each car throughout a long train, because the emergency brake pipe vent valve O is of a greater capacity than the brake pipe itself. The pressure entering passage 150 from chamber 23 flows direct to the brake cylinder through passage 136 when the emergency slide valve is in emergency position. Emergency brake cylinder pressure is registered in chamber 4 through passage 136, chamber 4 being at this time out of communication with the brake pipe, as the brake pipe port 3 is covered by the main slide valve. Because of the uninterrupted communication between chambers 4 and 53, by way of passage 96, the emergency brake cylinder pressure will likewise be registered in chamber 53, and because emergency reservoir pressure registered in chamber 50 below diaphragm 47 equalizes with the brake cylinder, the pressures in chambers 53, 50 and 52 are equal.

Should the triple valve be operated in quick release with the release governing valve 83 open, chamber 51 between diaphragms 47 and 48 will be out of communication with the atmosphere, as passages 118 and 120 do not register because of the position of cavity 119 which maintains this communication in all positions of the triple valve other than emergency and emergency lap.

In case the pilot valve should assume release position after an emergency application of the brakes, the brake cylinder pressure which at this time would enter passage 139 is prevented from being released to the atmosphere, as cavity 140 in the main slide valve is moved out of register with passages 139 and 134.

As previously stated, under certain conditions, both the emergency reservoir and the brake pipe reservoir pressures would flow direct to the brake cylinder. This will be the case should the brake pipe reservoir pressure be higher than the developed emergency brake cylinder pressure. If an emergency application is made following a full service brake application when carrying 70 pounds initial pressure in the brake pipe, only the emergency reservoir pressure will flow to the brake cylinder because the developed brake cylinder pressure resulting from the release of the undisturbed emergency reservoir pressure to the brake cylinder will develop a pressure therein in excess of 50 pounds, which was the pressure in the brake pipe reservoir at the time the emergency application was made. To prevent the high emergency reservoir pressure in chamber 23 being released into the lower brake pipe reservoir pressure, a check valve 153 is provided in passage 112. Pressure in chamber 23 which is, after an emergency brake application, brake cylinder pressure, is however permitted to slowly equalize with the lower pressure in the brake pipe reservoir through the by-pass 154 around check valve 153. If an emergency brake application is made while the brakes are fully released, both the brake pipe reservoir air and the emergency reservoir air will then flow to the brake cylinder and equalize therewith. This latter operation is necessary because of the empty brake cylinder, whereas when an emergency brake application is made following a full service or an over service brake pipe reduction, the brake cylinder is filled and the assistance of the brake pipe reservoir pressure in developing the desired emergency brake cylinder pressure is not needed, because of the augmentation of the already established brake cylinder pressure.

*Emergency lap position (Fig. 19).*

When a complete equalization occurs between the admitted emergency reservoir pressure in chamber 23, and the brake cylinder pressure, pressures on both sides of piston 22 will become equal and the emergency spring 32 will operate piston 22, together with the emergency slide valve L, to the right until the head 25 of stem 24 engages the stem 10. This operation will cut off communication between chamber 23 and chamber 90 beneath the emergency vent piston 94, which was previously established through passage 149, and vent the pressure from chamber 90 to atmosphere through passage 149, cavity 155 and passages 156 and 148. The release of pressure in chamber 90 to atmosphere will equalize the pressures on both sides of piston 94, because the chamber above this piston is in direct communication with the atmosphere through passage 93. Replacing spring 95 will then operate valve O and the piston 94 to closed position. Communication will also be cut off between chamber 8 and atmosphere at the left side of piston 9, as cavity 146 of the emergency slide valve L does not register with passages 145 and 147. With the main slide valve in emergency position chamber 8 is in communication with the brake pipe through passage 100, cavity 99 of the main slide valve and passage 2, the latter leading direct to the brake pipe connection 1, so that when an increase of brake pipe pressure occurs for the purpose of releasing the brakes after an emergency application, this increase of pressure will be registered in chamber 8. With the emergency slide valve in emergency lap position as shown in Fig. 19, a port 158 is provided as shown in dotted lines in this figure, to maintain communication between chamber 23 and the passage 150 which leads direct to the brake cylinder. This communication permits the pressure in chamber 23 to be in direct communication with the brake cylinder, and as the valve Q is still open in emergeny lap position, the pressure from the emergency reservoir and the brake pipe reservoir may flow to the brake cylinder to tend to maintain pressure therein. In other words a complete equalization at all times will exist between the emergency reservoir, the brake pipe reservoir, and the brake cylinder. The admission of brake pipe reservoir pressure to chamber 23 as previously described is past check valve 153 located in passage 112.

*Release of the brakes after an emergency brake application.*

To effect a release of the brakes, brake pipe pressure is increased at the brake valve on the locomotive in the usual manner, and this increase in brake pipe pressure is registered in chamber 8 through passage 2, cavity 99 of the main slide valve and passage 100. When the pressure in chamber 8 has been raised to an equality with the brake cylinder pressure in chamber 4, the graduating spring 19 assisted by the increased pressure in chamber 8 will operate the main slide valve and the parts directly connected therewith to service lap position. The emergency spring 32 will operate the emergency piston 22 and the emergency slide valve L to the position shown in Figs. 14 to 17. This operation of the parts will again place chamber 4 in direct communication with the brake pipe through passage 2, and this increase of pressure above that in chamber 23, which is at this time in direct communication with the brake pipe reservoir, will operate the main slide valve and graduating valve to brake pipe reservoir charging position, as well as all other parts of the triple valve. Charging of the brake pipe reservoir and the emergency reservoir will then be accomplished precisely as described in brake pipe reservoir charging position and emergency reservoir charging position.

What I claim is:

1. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a connection between the emergency piston and the emergency valve, and means affording a connection between the emergency piston and the service piston, the main and graduating valves being formed with ports and passages to control the admission and release of brake cylinder pressure and the emergency slide valve in emergency position operating to vent the brake pipe to atmosphere in emergency application of the brakes.

2. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a connection between the emergency piston and the emergency valve, means affording a connection between the emergency piston and the service piston, the main and graduating valves being formed with ports and passages to control the admission and release of brake cylinder pressure, a normally closed brake pipe vent valve, and means whereby the emergency slide valve in emergency application position will cause said vent valve to open.

3. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a connection between the emergency piston and the emergency valve, means affording a connection between the emergency piston and the service piston, the main and graduating valves being formed with ports and passages to control the admission and release of brake cylinder pressure, a normally closed brake pipe vent valve, an operating piston for said valve, and means whereby the emergency slide valve in emergency application position will admit emergency reservoir air to the vent valve piston and thereby open said vent valve.

4. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a connection between the emergency piston and the emergency valve, and means affording a connection between the emergency piston and the service piston, the main and graduating valves being formed with ports and passages to control the admission and release of brake cylinder pressure and the emergency slide valve in emergency position operating to vent the brake pipe to atmosphere in emergency application of the brakes, the main slide valve and the emergency slide valve in their emergency positions venting the supplemental brake pipe chamber direct to atmosphere.

5. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a connection between the emergency piston and the emergency valve, means affording a connection between the emergency piston and the service piston, the main and graduating valves being formed with ports and passages to control the admission and release of brake cylinder pressure, a normally closed brake pipe vent valve, means whereby the emergency slide valve in emergency application position will cause said vent valve to open, means affording communication to the emergency valve chamber from an air reservoir, and means whereby the main and graduating valves in service position connect the supplemental brake pipe chamber to the emergency valve chamber.

6. A triple valve for air brake apparatus formed with a main brake pipe chamber provided with a brake pipe connection and having aligned cylindrical extensions of different diameters at its opposite ends, a service piston in the smaller extension of said chamber, a larger release and emergency piston in the larger extension of said chamber, a supplemental brake pipe chamber on the opposite side of the service piston from the main brake pipe chamber, an emergency valve chamber on the opposite side of the emergency and release piston from the main brake pipe chamber, a main slide valve in the main brake pipe chamber, a graduating valve in said chamber, means operatively connecting said valves to the service piston, an emergency valve in the emergency valve chamber, means affording a lost motion connection between the emergency piston and the emergency valve, means affording a lost motion connection between the emergency piston and the service piston, the main and graduating valves being formed with ports and passages to control the admission and release of brake cylinder pressure, the emergency valve in emergency position operating to place an emergency reservoir in communication with the brake cylinder, a quick release piston, a quick release valve controlling communication between an emergency reservoir and the main valve chamber, means whereby the quick release piston will be moved and the quick release valve will be opened when main and graduating valves are in release position, a manually operable valve controlling the operation of the quick release piston, means whereby the main slide valve in full release position will connect the brake cylinder to an exhaust port, a manually operable valve controlling communication between said exhaust port and atmosphere, an actuating diaphragm, a controlling diaphragm, an emergency diaphragm, an actuating chamber formed by the actuating diaphragm and in direct communication with the brake pipe, a controlling chamber between the actuating diaphragm and the controlling diaphragm and in communication with the brake cylinder, a retention chamber between the controlling diaphragm and the emergency diaphragm, an emergency reservoir chamber in communication with the emergency reservoir, a pilot valve operatively connected to said diaphragms and in its release position connecting the controlling chamber to the retention chamber and in its lap position closing said communication, and means affording communication from the retention chamber to an atmospheric port through the emergency slide valve, and a manually operable valve to control said atmospheric port.

7. A triple valve for air brake apparatus formed with a main brake pipe chamber provided with a brake pipe connection, a service piston, a larger release and emergency piston, a supplemental brake pipe chamber, an emergency valve chamber, a main slide valve in the main brake pipe chamber, a graduating valve in said chamber, means operatively connecting said valves to the service piston, an emergency valve in the emergency valve chamber, means affording a connection between the emergency piston and the emergency valve, the main and graduating valves being formed with ports and passages to control the admission and release of brake cylinder pressure, the emergency valve in emergency position operating to place an emergency reservoir in communication with the brake cylinder, a quick release piston, a quick release valve controlling communication between an emergency reservoir and the main valve chamber, means whereby the quick release piston will be moved and the quick release valve will be opened when main and graduating valves are in release position, a manually operable valve controlling the operation of the quick release piston, means whereby the main slide valve in full release position will connect the brake cylinder to an exhaust port, a manually operable valve controlling communication between said exhaust port and atmosphere, an actuating diaphragm, a controlling diaphragm, an emergency diaphragm, an actuating chamber, formed by the actuating diaphragm and in direct communication with the brake pipe, a controlling chamber between the actuating diaphragm and the controlling diaphragm and in communication with the brake cylinder, a retention chamber between the controlling diaphragm and the emergency diaphragm and an emergency reservoir chamber in communication with the emergency reservoir, a pilot valve operatively connected to said diaphragms and in its release position connecting the controlling chamber to the retention chamber and in its lap position closing said communication, and means affording communication from the retention chamber to an atmospheric port through the emergency slide valve, and a manually operable valve to control said atmospheric port.

8. A triple valve for air brake apparatus operating upon a reduction of brake pipe pressure to admit air to a brake cylinder and operating upon an increase of brake pipe pressure to release air from a brake cylinder and provided with a connection plate having passages through which air will flow in the operation of the triple valve, said passages being of standard maximum capacity, and a restriction plate interposed between the connection plate and the triple valve body, said restriction plate being provided with restricted ports registering with the passages in the connection plate and with corresponding passages in the valve body, for the purpose set forth.

In testimony whereof I hereunto affix my signature.

SPENCER G. NEAL.